Feb. 17, 1948. L. R. BUCKENDALE ET AL 2,435,955
VEHICLE BRAKE
Filed Dec. 22, 1944 6 Sheets-Sheet 1

Inventors
LAWRENCE R. BUCKENDALE
RALPH K. SUPER

By Strauch & Hoffman
Attorneys

Feb. 17, 1948. L. R. BUCKENDALE ET AL 2,435,955
VEHICLE BRAKE
Filed Dec. 22, 1944 6 Sheets-Sheet 2

Inventors
LAWRENCE R. BUCKENDALE
RALPH K. SUPER
By Strauch & Hoffman
Attorneys

Patented Feb. 17, 1948

2,435,955

UNITED STATES PATENT OFFICE 2,435,955

VEHICLE BRAKE

Lawrence R. Buckendale and Ralph K. Super, Detroit, Mich., assignors to The Timken-Detroit Axle Company, Detroit, Mich., a corporation of Ohio Application December 22, 1944, Serial No. 569,392

14 Claims. (Cl. 188—78)

This invention relates to improvements in vehicle brakes and has particular reference to an improved brake of the character referred to in the art as a "dual primary" brake and disclosed in United States Letters Patent No. 2,337,069 and No. 2,337,070.

While dual primary brakes have proved to be highly satisfactory in operation and the operative principles have been successfully demonstrated, certain practical problems have arisen in connection with the production and operation of such brakes which it is among the objects of the present invention to solve.

The more important problems encountered in the construction and operation of brakes of the character indicated involve the provision of the best means of supporting the brake shoes, actuating levers, and shoe expanding means, and the provision of brake shoe adjusting means having a range of adjustment such that the entire effective thickness of even a thick lining can be used up without producing uneven wear or exposing any of the lining rivets or any portion of the shoe surface to contact with the brake drum.

They also involve the provision of an economical brake mechanism compactly arranged to fit into the limited space available on a heavy duty vehicle, with parts readily accessible for adjustment and repair and of a simplified construction with a minimum number of parts.

Problems have also arisen from the circumstance that some vehicles to which the brakes are applied are equipped with hydraulic brake systems while others use pneumatic brake actuators or boosters energized by compressed air or by engine manifold vacuum so that the brakes must be adapted for either method of operation.

Some difficulty has also been encountered in preventing overheating of the brakes on certain types of heavy duty vehicles, particularly in the case of brakes associated with dual wheels when it is necessary to enclose a large portion of the heat radiating area of the brake drum.

With these and other considerations in view, it is an important object of the invention to provide an improved vehicle brake mechanism particularly adapted for economical quantity production.

A further object resides in the provision of an improved vehicle brake mechanism of the character indicated having a range of adjustability for lining wear sufficient to use up the available thickness of thick heavy duty linings, together with means automatically maintaining a substantially concentric relation between the brake lining and brake drum with a uniform application of braking pressure throughout the surface area of the lining.

A still further object resides in the provision of an improved brake mechanism of the character indicated having a compact arrangement so that brakes of adequate size and capacity may be fitted into the limited spaces available on heavy duty vehicles.

It is another object of the invention to provide novel equalizing coupling means between the brake levers and the actuating means therefor to insure the equal transmission of braking forces through said levers to the respective brake shoes.

An additional object resides in the provision of an improved brake mechanism of the character indicated which may be readily converted from hydraulic to pneumatic operation or vice versa.

Another object resides in the provision of an improved brake mechanism of the character indicated having provisions for the rapid dissipation of friction generated heat.

Other objects and advantages will become apparent from the following description in connection with the accompanying drawings and from the appended claims.

In the drawings, in which like reference numerals are used to designate similar parts throughout, there is illustrated a suitable mechanical embodiment for the purpose of disclosing the invention. The drawings, however, are for purposes of illustration only and are not to be taken in a limiting or restrictive sense as it will be apparent to those skilled in the art that various changes in the illustrated embodiment may be resorted to without in any way exceeding the scope of the invention.

Figure 1:
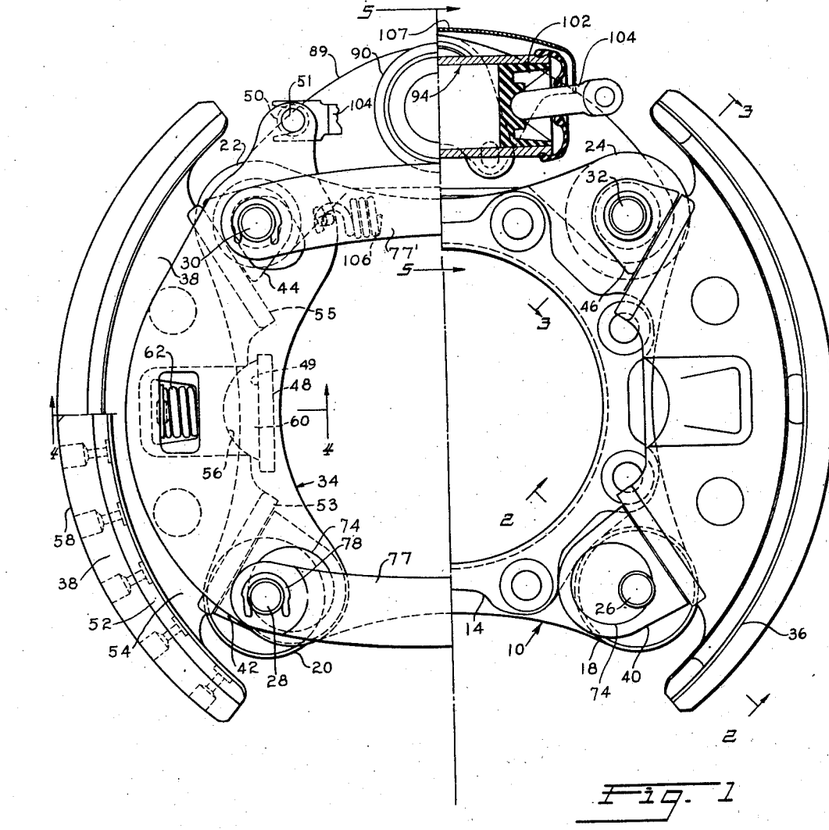
Figure 1 is an elevational view of the improved brake mechanism with the brake drum removed and the dust shield and shoe actuating lever omitted from the right hand half.
Figure 2:
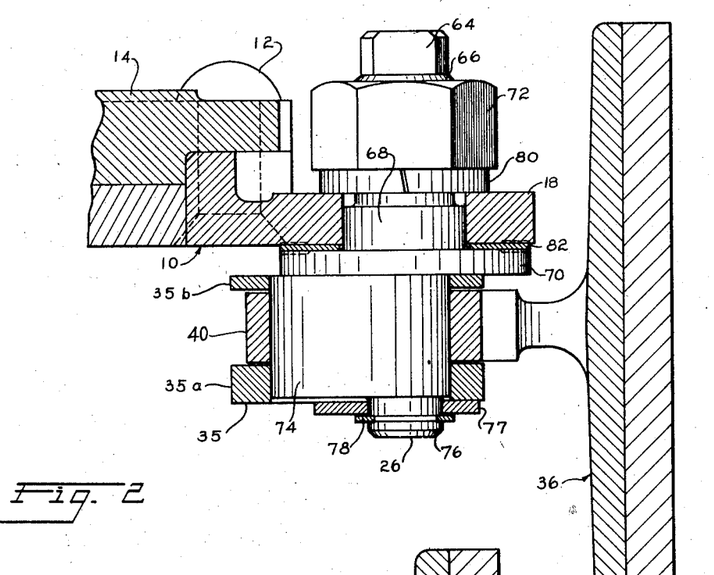
Figure 2 is a fragmentary sectional view on an enlarged scale on the line 2—2 of Figure 1 showing one of the brake shoe supporting and adjusting devices.
Figure 3:
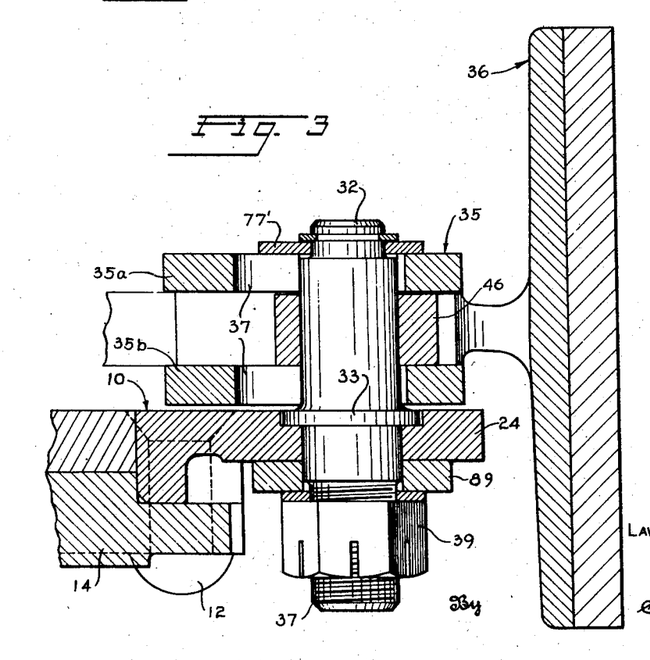
Figure 3 is a fragmentary sectional view on an enlarged scale on the line 3—3 of Figure 1 showing one of the shoe supporting anchor pins.

With continued reference to the drawings and particularly to Figures 1 to 6 inclusive, the numeral 10 generally indicates the brake spider or foundation member which supports the movable part of the brake mechanism. This foundation member is preferably a steel forging and is rigidly secured to the axle housing by means of bolts or rivets 12, as shown in Figures 2 and 3, passing through suitable apertured bosses in the foundation member and through registering apertures in a brake adapter flange 14 welded or otherwise permanently secured on the axle housing 15, or may itself be directly permanently secured on the axle housing, as is clearly illustrated in Figure 6, by suitable means such as the welds 16.

This foundation member 10 is provided with angularly spaced apertured bosses or lugs, as indicated at 18, 20, 22, and 24 in Figure 1, which receive and support corresponding anchor pins 26, 28, 30, and 32.

Two brake actuating levers 34 and 35, one of which is generally indicated at 34 in Figure 1, are pivoted at their lower ends on the anchor pins 28 and 26 respectively. Brake shoes, as indicated at 36 and 38, are operatively associated with the levers and engaged by abutment members 40, 42, 44, and 46 pivotally supported on the respective anchor pins.

Figure 4:
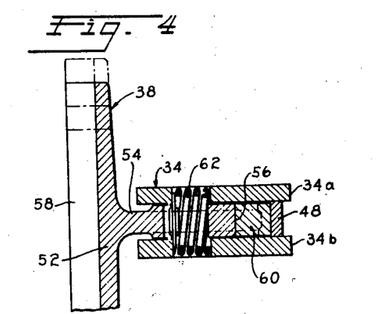
Figure 4 is a fragmentary sectional view on the line 4—4 of Figure 1 showing a transverse section through the brake shoe and actuating lever.

Each lever member comprises a pair of similar spaced parallel plates as indicated at 34a and 34b in Figure 4. A saddle bar, as indicated at 48, is disposed between the plates at approximately the mid-length of their inner edge portions and butt-welded to both of the plates. A spacer, as indicated at 50 in Figure 1 which may conveniently comprise a sleeve, is inserted between registering apertures and a rivet or pin member 51 extends through said apertures and sleeve and is expanded at its ends.

The brake shoes are substantially identical and the shoe 38, selected for detailed description, comprises an arcuate wide flanged portion 52 and an integral web portion 54 which extends between the plates of the corresponding shoe actuating lever and is provided at its end with planar abutment surfaces 53 and 55 which respectively engage the corresponding anchor pins supported abutment members 42 and 44, and at its mid-length portion with an arcuate recess, as indicated at 56. The flange 52 carries brake lining, as indicated at 58, which may be either riveted or cemented to the flange and which in the case of the thicker linings, may be divided into two or more pieces in order to relieve the rivets or cement from the strain incident to the tendency of the thick lining to pull away from the brake shoe.

A pressure block 60 of generally semi-circular plan form is disposed between the saddle bar 48 and the recessed portion 56 of the shoe web and is held in compression between the saddle bar and the shoe web by a compression spring 62 which is disposed in registering apertures in the lever plates and the shoe web and acts to urge the shoe substantially radially inwardly relative to the corresponding lever.

The anchor pins 26 and 28 which pivotally support the lower ends of the shoe actuating levers are similar in construction and the anchor pin 26 has been selected for detailed description and is particularly illustrated in Figure 2. Pin 26 is in the form of a bolt having at one end a non-circular portion 64 adjacent which is a screw threaded portion 66, a cylindrical pilot portion 68 dimensioned to closely and rotatably fit the cylindrical pin receiving aperture in foundation member 10, an annular concentric flange 70 which bears against the side of the foundation member opposite a nut 72 screw threaded on the threaded portion 66, a cylindrical eccentric portion 74 and a grooved end portion 76 at its other end coaxial with the parts 64 and 68. As is fully shown in Figure 2 the eccentric portion 74 extends through both side plates 35a and 35b of the lever 35 and through the brake shoe abutment 40 which is disposed between the side plates of the lever, the lever and abutment member being secured on the pin by one end of a connecting member 77 between said pin and the opposite pin 28 and a resilient key 78 engaged in the groove of the end 76 of pin 26.

With the arrangement illustrated, the associated shoe and lever components may be adjusted for lining wear by rotating the anchor pin 26. To accomplish this, nut 72 is loosened, the pin is turned by the squared or non-circular end portion 64 to the proper adjusted position and the nut is then tightened against the lock washer 80 which holds it against accidental displacement. An alternate twist lock washer 82 may be disposed between flange 70 and the adjacent surface of foundation member 10 to hold the pin against rotation away from its adjusted position. Shoe 38 and lever 34 are similarly adjusted by rotating pin 28.

It will be noted that by means of the above construction a simultaneous and equal adjustment of the shoe and its actuating lever, at their lower anchored ends, is obtained by the operation of a single cam or eccentric. As the abutment 40 is moved upwardly and to the right (see Figure 1) to reduce the distance between said abutment and the upper abutment 46 and move the brake shoe toward the drum, the lever plates 35a and 35b are similarly adjusted to lengthen the mechanical connection between said plates and the brake actuating unit to be presently described.

Figures 9, 10:
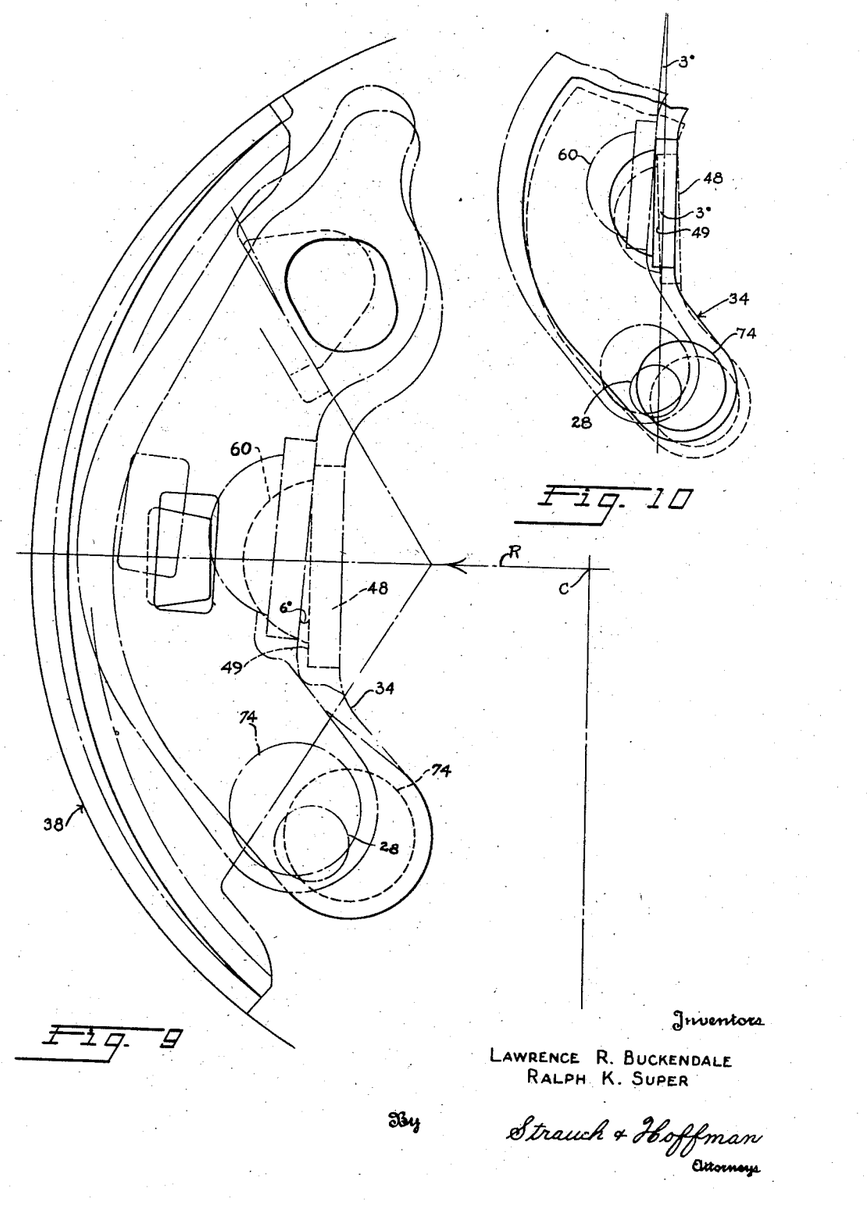
Figures 9 and 10 are diagrammatic views illustrating the relative displacement between each shoe and lever during the entire wear adjustment range, Figure 10 illustrating the inclined saddle bar face of the invention.

Figure 9 illustrates the changes in relative positions of each lever and its associated shoe during the wear adjustment range. Suppose that with new lining on the brake shoe and cam 74 in the dash-line position, the planar face 49 of saddle bar 48 is disposed normal to the resultant R of the brake applying forces transmitted through pressure block 60, as illustrated in dash lines in Figure 9, this being the condition for optimum efficiency of operation. Brake lining adjustment wear is compensated for by rotating anchor pin 28 counter-clockwise until when the brake lining is fully worn cam 74 has moved to the long and short dash-line position of Figure 9.

This movement of cam 74, see also Figure 1, displaces both abutment 42 and lever 34 outwardly and upwardly. Since the upward movement of abutment 42 decreases the spacing of abutments 42 and 44, brake shoe 38 is moved radially outwardly relative to the abutments. Lever 34, being mounted at one end on a fixed pivot and having only the same movement as the abutments, cannot exactly follow this radial movement of the shoe, there is relative angular movement between lever 34 and shoe 38 so that face 49 tilts with respect to its original normal position.

In order for pressure block 60 and face 49 to maintain full surface engagement after such adjustment, the pressure block, accordingly, rocks about its axis and these parts assume the long-short dash line positions of Figure 9. I have found that face 49 may rock six degrees (6°) or more during the range of wear adjustment. A considerable component of brake applying force is lost in this relation of the parts.

According to one phase of the invention, I halve the degree of departure of face 49 from the normal by arranging face 49, with new lining, at an angle to the normal equal to half the calculated total angular displacement of face 49 during adjustment so that when the lining is half worn and properly adjusted the face 49 is at its optimum normal position and at no time is more than half the total angular displacement, here three degrees (3°), from the normal.

This new arrangement is illustrated in Figure 10 which illustrates in short dash lines, full lines, and long and short dash lines the relative position of cam 74 and face 49 during initial new lining, half worn lining and fully worn lining conditions. This arrangement is more efficient than that of Figure 9.

By reason of the small angle of the face 49 of bar 48, the brake applying thrust forces will be transmitted through the lever to the brake shoe in all adjusted positions of said shoe and lever in lines which are substantially normal to the connecting line between the axes of the rotatable abutments. In this manner concentricity of the brake lining with the wall of the brake drum is maintained with the simultaneous application and distribution of braking pressure throughout the surface area of the lining to the surface of the drum wall.

Figure 5:
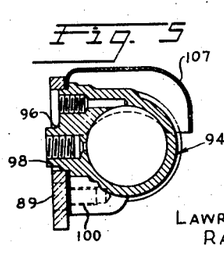
Figure 5 is a fragmentary sectional view on the line 5—5 of Figure 1 showing the hydraulic shoe expanding mechanism.

The brake may be actuated by various shoe expanding means, a hydraulic device being illustrated in Figures 1 and 5, and a pneumatically actuated shoe expanding device in Figures 6, 7, 8, 11 and 12. For supporting the hydraulic shoe expanding mechanism, a bracket 89 is provided having apertures adjacent its ends and an apertured boss 90 at approximately the center thereof. Anchor pins 30 and 32 pass through the end apertures and rigidly secure bracket 89 to foundation member 10.

A suitable wheel brake cylinder, generally indicated at 94, is provided on one side thereof and at substantially its mid-length position with an apertured boss 96 which is received in the aperture of the boss 90. The apertured boss 96 is provided with a terminal portion 98 which connects a suitable hydraulic fluid conduit with the interior of the cylinder and the cylinder is secured to the bracket 89 by suitable means such as cap screws, one of which is indicated at 100. Internally of the cylinder is a pair of opposed pistons, one of which is indicated at 102 in Figure 1, connected by suitable links, as indicated at 104, with the spacers 50 surrounding the pins or rivets at the upper ends of the shoe actuating levers.

With this construction when hydraulic fluid under pressure is admitted to the interior of the cylinder 94 the pistons are forced apart moving the upper ends of the shoe actuating levers outwardly to bring the shoe linings into contact with the inner surface of the brake drum. The upper ends of the levers are moved inwardly to bring the shoes out of contact with the drum by suitable means such as the simple tension spring 106 secured at its ends to pins passing through the upper end portions of the shoe actuating levers. Preferably the cylinder 94 is protected from the heat of the brake drum by a suitable metal shield 107.

The pins 30 and 32 are similar and pin 32 is particularly illustrated in Figure 3. Pin 32 may comprise a cylindrical bolt member having intermediate its length a flange or shoulder 33, a threaded end portion 37 upon which is threaded a retaining nut 39 which clamps the end of bracket 89 to lug portion 24 of the foundation member 10. At its outer end the bolt may be provided with an annular groove receiving a resilient key which retains the end of connecting member 77' in place against the outer surface of the brake shoe lever 35.

The apertures in the lower ends of the brake levers are circular and closely fit the eccentric portion 74 of the pins 26 and 28 while the apertures 37 in the upper end portions of the brake levers through which the pins 30 and 32 project are elongated to provide freedom of movement of the upper portions of the brake levers relative to the upper anchor pins.

Connecting members 77 and 77' between lower and upper anchor pins respectively serve as braces in the assembly.

Figures 6, 12:
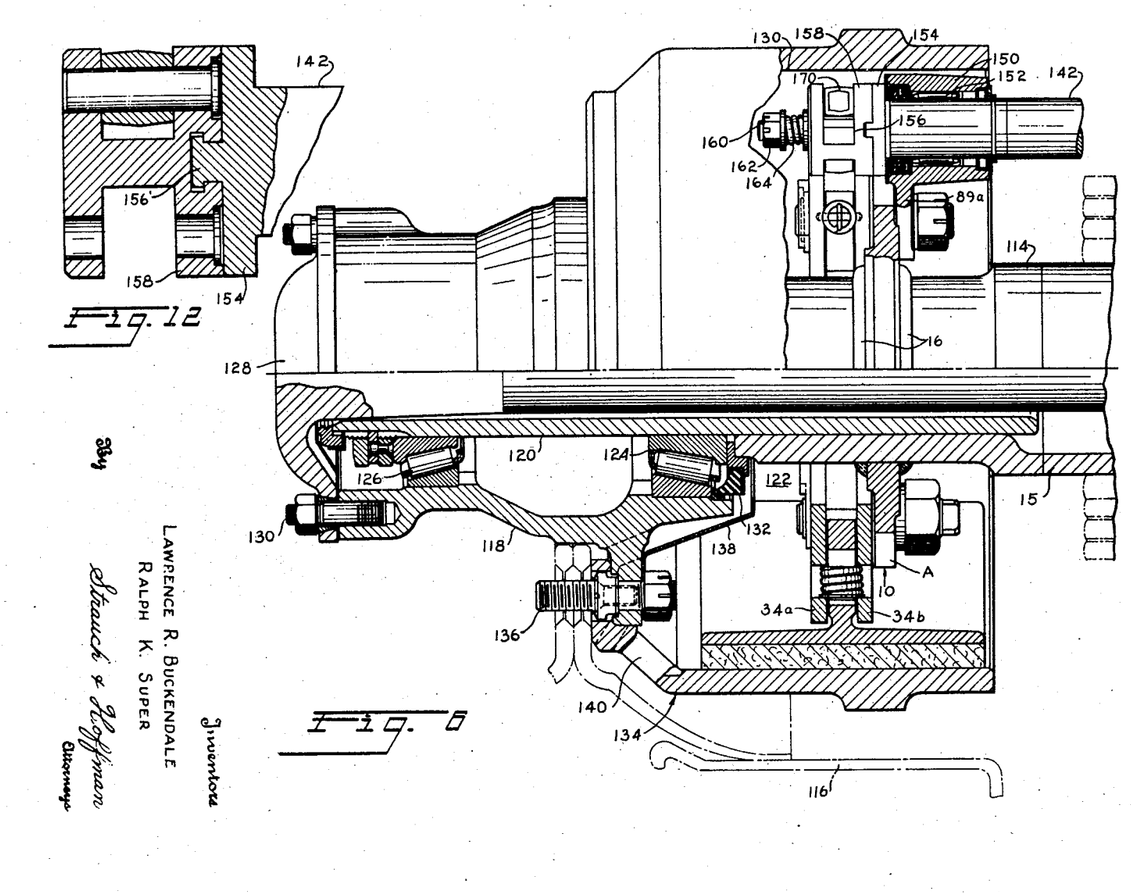
Figure 6 is a longitudinal sectional view of the improved brake mechanism showing the application thereto of a pneumatically actuated shoe expanding mechanism.
Figure 12 is a similar view of a modified construction.

Referring now to Figure 6 wherein the foundation member or spider 10 is welded directly onto the exterior of the axle housing 15, it will be observed that this support member is located intermediate the width of the brake shoes and that the anchor pins and all other parts of the brake mechanism are contained between the planes of the opposite side edges of the brake shoes. This provides a compact and convenient arrangement wherein substantially all of the space allotted to the brake may be taken up by the width of the brake shoes and brake drum without the necessity of providing space beyond the shoes and drum for the support member and other components of the brake mechanism. Also, by providing for the maximum shoe and drum width the diameter of the drum can be held at a minimum so that, in the case of a dual wheel arrangement, as illustrated in Figure 6, the entire brake mechanism may be disposed within the rim 116 of the inner wheel of the dual wheel set. In the arrangement shown in Figure 6 the wheel hub 118 is journalled on a suitable support such as the wheel bearing sleeve 120 extending outwardly from the housing sleeve boss 122 at the end of the axle housing 15, spaced anti-friction roller bearings 124 and 126 being disposed between the hub and the wheel bearing sleeve. An axle shaft 128 extends through the housing and the wheel bearing sleeve and is connected to the outer end of the hub by suitable means such as the stud bolts 130. A suitable oil seal 132 is disposed between the axle housing and the hub to prevent hub lubricant from leaking into the brake mechanism and a brake drum, generally indicated at 134, is secured to the hub by suitable means such as the lug bolts 136 which also serve to secure the tire rims to the hubs. An oil baffle 138 is secured to the hub by the lug bolts 136 and has a flange portion overlying the seal 132 to direct any lubricant leaking past the seal away from the brake mechanism.

If desired a dust shield (not illustrated) may be secured to the axle housing 15 at the opened end of the drum to exclude dirt and water from the brake mechanism. It has been found however that, particularly in the case of heavy duty brakes, with the dust shield omitted sufficient dirt and water does not enter the brake mechanism to seriously affect the operation of the brake. Omission of the dust shield permits the free entry of cooling air into the brake mechanism and suitable apertures, as indicated at 140, may be provided in the brake drum to permit the air to flow into the brake mechanism at one side thereof, through the brake mechanism and out of the opposite side. These apertures also provide a certain amount of forced circulation when the drums are rotating and are of particular advantage when the drums are enclosed in the inner tire rims as is the case in the construction illustrated in Figure 6. The outer edge of the foundation member 10 is spaced away from the inner surface of the brake drum in order to provide ample space between this member and the brake drum for the flow of cooling air through the brake mechanism.

Figures 7, 11:
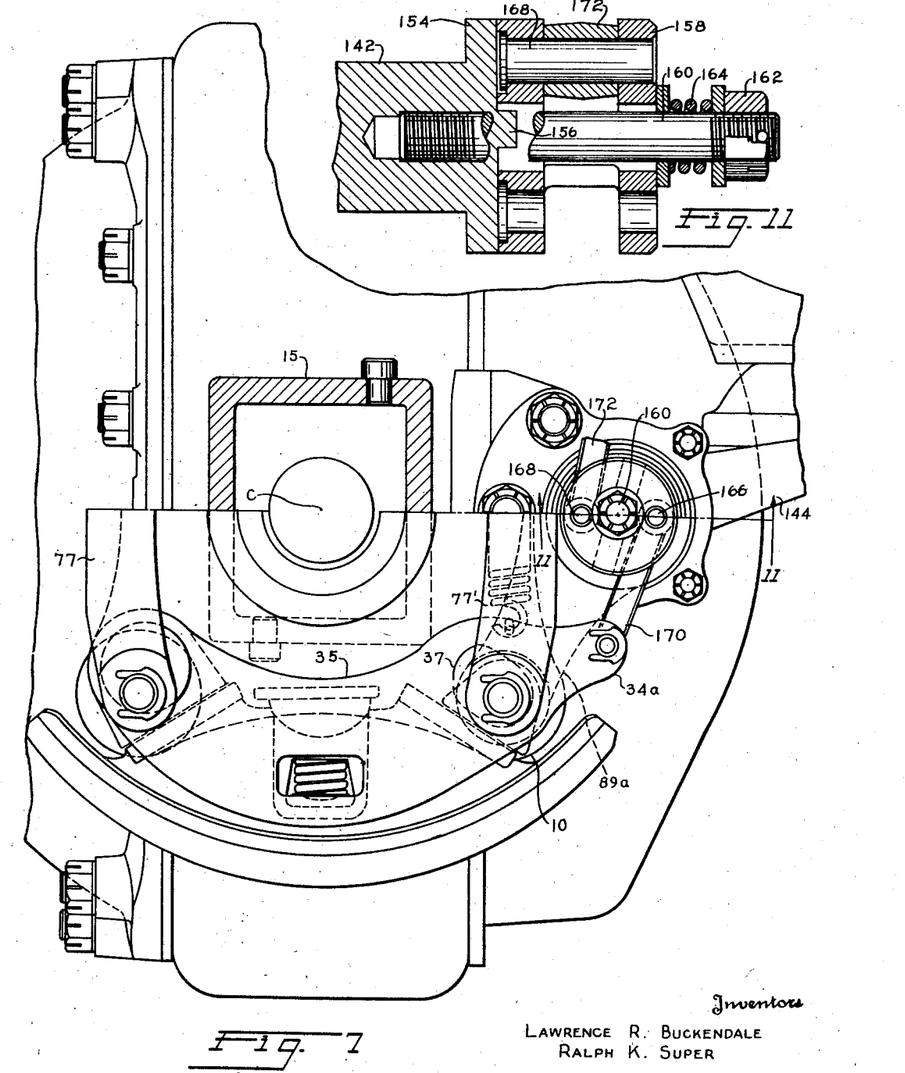
Figure 7 is an elevational view of a portion of the brake mechanism of Figure 6 with the brake drum removed showing an end view of the pneumatic shoe expanding mechanism.
Figure 11 is a detail sectional view taken substantially on the line 11—11 of Figure 7.
Figure 8:
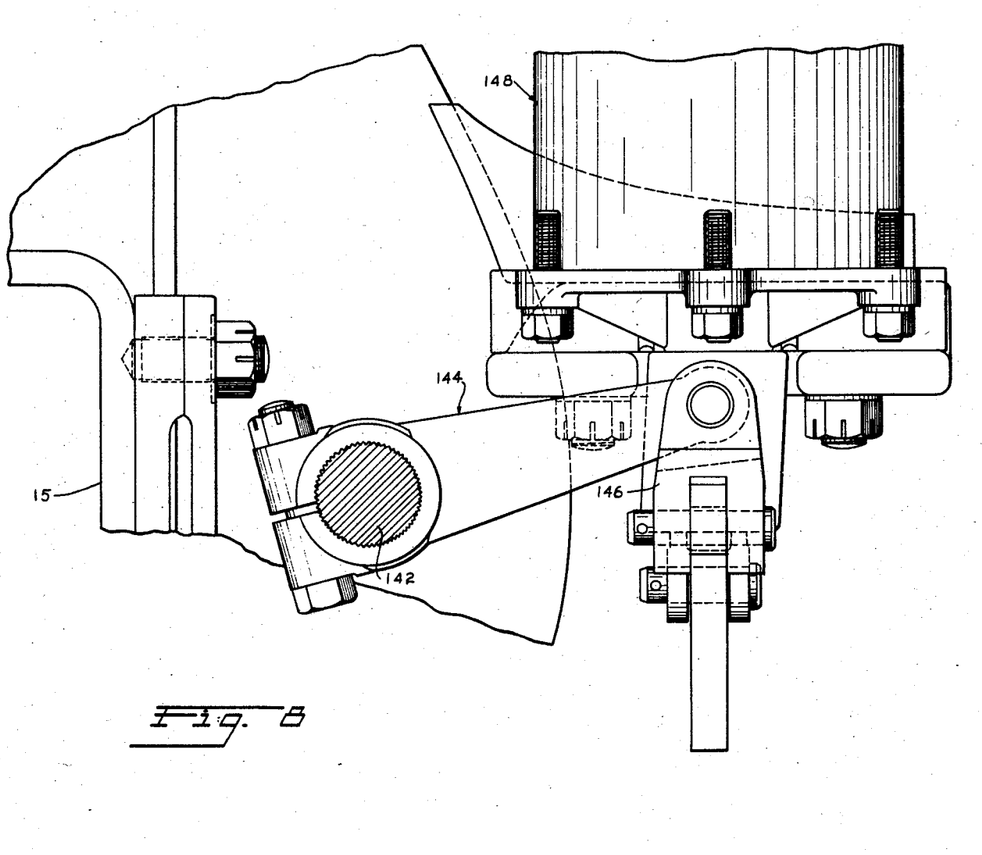
Figure 8 is an elevational view of a fragmentary portion of the pneumatic brake actuating mechanism.

As explained above, the improved brake mechanism may be conveniently actuated by either hydraulic or pneumatic means and a suitable pneumatic operating mechanism is shown in Figures 6, 7 and 8. In the arrangement illustrated, a torque shaft 142 is mounted on the axle housing by suitable brackets with its axis parallel to the axis of the axle. At its inner end the torque shaft is provided with a lever 144 the free end of which is connected by suitable link mechanism 146 to the piston rod of a pneumatic actuator, generally indicated at 148. The actuator 148 may be of any suitable or desired construction and may be operated either by compressed air or by engine intake manifold vacuum in some conventional or desired manner. Operation of the actuator 148 acting through the arm 144 acts to rotate or oscillate the shaft 142 about its longitudinal axis in its support on the axle housing.

At its outer end the shaft 142 is journalled in a bearing cage 150 secured to a bracket 89a which is similar to bracket 89 but differs from it in detail. Bracket 89a is secured to foundation member 10 by corresponding anchor pins as described above. Cage 150 is equipped with an anti-friction bearing such as the needle bearing 152. The inner end of the shaft 142 is provided with a concentric enlargement, as indicated at 154, having a diametrical tongue 156 thereon, illustrated in detail in Figure 11. A generally cylindrical head 158 is retained on the end of the shaft by means of a stud 160 screw threaded into the end of the shaft and extending through the head. The head is provided with a groove which receives the tongue 156 and with an enlarged aperture through which the stud 160 passes. A nut 162 is screw threaded onto the outer end of the stud 160 and compresses a coil spring 164 against the outer end of the head so that the head is maintained securely against the outer end of the shaft but has a limited freedom of movement longitudinally of the tongue 156 for a purpose to be presently described. The side portions of the head 158 are cut away between the two end portions thereof and pins, as indicated at 166 and 168, extend one through each cutaway portion and are mounted at their ends in the end portions of the head. These pins are substantially diametrically opposed and are arranged on opposite sides of the stud 160. A pivoted toggle link 170, Figure 7, extends outwardly from the pin 166 and is pivotally connected at its outer end to the corresponding end of brake shoe actuating lever 35. Similarly, a pivoted toggle link 172 extends outwardly from the pin 168 to a pivotal connection with the corresponding end of the other brake shoe actuating lever, not illustrated.

With this arrangement, clockwise rotation of shaft 142 will rotate the head 158 with the pins 166 and 168 which will move the toggle links 170 and 172 outwardly simultaneously, moving the corresponding ends of the shoe actuating levers to bring the shoes into contact with the brake drum. If the initial clearance between the shoes and the drum is not identical for both shoes the torque transmitting connection comprising the tongue 156 and the corresponding groove in the head member 158 will permit the head member to slide on tongue 156 and find its own center relative to the shaft 142 and equalize the brake applying forces exerted on the two levers.

In Figure 12 there is illustrated a somewhat modified, and in some respects preferable, arrangement for converting the rotational movements of shaft 142 into brake applying and releasing movements of the shoe actuating levers. In this arrangement stud 160 and compression spring 164 are omitted, and a tongue 156' of T section or dovetail shape is provided on the shaft enlargement slidably received in a similarly shaped groove or guideway in the head. The shape of the tongue and groove construction retains the head on the shaft while permitting sliding equalizing movement of the head transversely of the shaft along the tongue.

It is also to be noted in Figure 7 that the brake shoes are disposed one at each side of a horizontal line passing through the geometrical center of the brake mechanism rather than upon opposite sides of a vertical line passing through said center as is the case in the arrangement shown in Figure 1. It has been found that the shoes will operate with equal efficiency in either arrangement and the arrangement symmetrical of the horizontal line permits the actuating mechanism to be disposed to the front or rear of the axle where it does not interfere with the clearance between the axle and the chassis of the vehicle and does not interfere in any way with the vehicle spring suspension.

In adapting the improved brake mechanism for either hydraulic or pneumatic operation it is necessary to incorporate the correct bracket 89 or 89a, the remainder of the brake mechanism being the same for either method of operation. This not only provides for easy conversion of the brake mechanism from one manner of operation to the other but greatly simplifies the manufacturing and servicing of the brakes since all of the brake parts except the special brackets are the same for both actuating means.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by United States Letters Patent is:

1. Brake mechanism comprising an anchor pin mounted for adjustment by rotation about its axis, a cylindrical eccentric on said pin and rotatable therewith, a brake shoe abutment member pivotally mounted on said eccentric, a lever pivotally mounted on said eccentric, and a brake shoe having an abutment surface slidingly engaged with said abutment member and having a rockable and sliding motion transmitting connection with said lever, whereby said brake shoe and lever are simultaneously adjusted upon rotation of said pin about its axis.

2. In a brake mechanism; a relatively fixed foundation member having a plurality of angularly spaced apertured bosses; two pairs of anchor pins mounted in four of said bosses; a brake shoe abutment on each anchor pin; a pair of brake shoes supported by said abutments for movement radially of said mechanism; a pair of brake actuating levers each pivoted at one end on a respective anchor pin; and a shoe expanding device supported by said foundation member between adjacent ends of said levers and operatively associated with said lever ends.

3. The brake mechanism as defined in claim 2 wherein the anchor pins on which said levers are pivoted are provided with eccentric cam portions extending through said lever ends and the corresponding brake shoe abutments and are rotatably adjustable to adjust said levers and brake shoes for brake lining wear.

4. The brake mechanism as defined in claim 2 wherein said shoe expanding device comprises a rotatable shaft journalled on said foundation member; a head on the end of said shaft; a pair of pins carried by said head spaced from the axis of rotation of said shaft; and a respective link connecting each pin with a corresponding shoe actuating lever end.

5. The brake mechanism as defined in claim 2 wherein said shoe expanding device comprises a rotatable shaft journalled on said foundation member; a head on the end of said shaft; a pair of pins carried by said head spaced from the axis of rotation of said shaft; and a respective link connecting each pin with a corresponding shoe actuating lever end; and a torque transmitting connection between said shaft and said head providing freedom of movement of said head transversely of said shaft to equalize the pressures exerted on said lever ends by said links.

6. The brake mechanism as defined in claim 2 wherein said shoe expanding device comprises a bearing cage secured to said foundation member; a shaft journalled in said bearing cage; a head on said shaft carrying a pair of pins spaced from the axis of said shaft and angularly spaced from each other; a toggle link connecting each pin with a shoe actuating lever end; and a slidable torque transmitting connection between said shaft and said head operative to equalize the pressure exerted on said lever ends by providing freedom of centering movement for said head.

7. In a brake mechanism; a foundation member; two pairs of anchor pins secured to said foundation member and disposed one pair on each side of a line passing through the center of said foundation member with the pins of each pair substantially equally spaced from a line perpendicular to said first mentioned line at said center; a pair of lever members each pivoted at one end on an anchor pin of the corresponding pair of anchor pins and each comprising a pair of spaced parallel plates and a saddle bar joining said plates along the inner edges thereof intermediate the length of said lever; a pair of brake shoes each having a lining supporting flange portion and a web portion received between the plates of a corresponding lever and provided with an arcuate recess; a generally semicircular shaped pressure block received in each recess and bearing against the associated saddle bar; shoe abutments mounted one on each anchor pin and supporting said shoes in operative position; and resilient means acting between the lever and shoe of each shoe and lever combination to maintain the corresponding pressure block under compression between the shoe web and the saddle bar; each saddle bar having its pressure plate contacting surface inclined to a line joining the anchor pins associated with the corresponding lever.

8. A brake shoe actuating lever comprising a pair of spaced parallel plate members having registering apertures in the opposite end portions thereof; and a saddle bar joining said plate members along the inner edges thereof intermediate the length of said lever, said saddle bar having the operative surface thereof inclined relative to a line joining the center lines of said apertures.

9. Brake mechanism comprising a brake shoe actuating lever pivotally supported at one of its ends; an abutment member adjacent each end of the lever; a brake shoe having opposite end portions in contact with the respective abutment members; means operatively associating said brake shoe and said lever for angular movement about an axis transverse to the lever and constituting the sole means for transmitting the brake applying movement of said lever to said brake shoe; and means for variably adjusting the spaced apart relation of said abutment members to compensate for brake wear comprising a rotatably adjustable anchor pin for the pivoted end of said lever having a single eccentric portion coacting with said lever and the corresponding abutment member to simultaneously and equally adjust the angular positions of said lever and abutment member with respect to the pivot axis of the lever 10. In combination with a mounting member adapted to be secured upon an axle housing; diametrically opposed brake lever and shoe assemblies on said member, anchor pins for corresponding ends of the brake levers rotatably mounted in said member and each having means coacting with the associated lever and shoe assembly to angularly adjust the same relative to the axis of said pin, additional anchor pins mounted in said member, passing through elongated openings in the other ends of said levers, and provided with means limiting pivotal movement of the respective levers and axial movement thereof with respect to said pins, and means for selectively and interchangeably mounting different types of brake actuating units upon said additional anchor pins for operative connection with said levers.

11. In a brake mechanism, a brake lever pivoted at one end and connected to an actuator at its other end, a brake shoe supported between pivoted abutments at circumferentially spaced portions and having a rocking sliding motion transmitting coupling with said lever through a pressure block having an arcuate face engaged with a recess in said shoe and a planar face engaged with a planar face on said lever, and means for adjusting said brake shoe for compensating for lining wear, the planar face of said lever being arranged at an initial small angle with respect to normal to the resultant of brake applying forces transmitted through said pressure block and adapted to pass through parallelism with said normal during the range of wear adjustment of said brake shoe.

12. A vehicle brake mechanism comprising a relatively fixed foundation member, four angularly spaced anchor pins mounted on said foundation member, brake levers pivotally mounted adjacent one end on two adjacent anchor pins, said levers being provided at their other ends with elongated openings through which the other two of said anchor pins pass, means on said other two pins preventing movement of said brake levers axially of said pins, a bracket secured to said foundation member by said other two anchor pins, and a brake lever expanding device mounted on said bracket and operatively connected to said levers.

13. In a brake mechanism having an annular brake drum of substantial width journalled on an axle housing and surrounding a portion of the housing, a foundation member fixed on said housing portion at a location intermediate the width of and parallel to but spaced from a plane bisecting the width of said drum, brake shoes and shoe actuating levers supported on said foundation member, said levers being connnected to said shoes by means lying in said bisecting plane whereby the line of thrust of forces exerted by said levers on said shoes lie in said bisecting plane, and a shoe expanding device supported on said foundation member and operatively associated with said levers.

14. In a vehicle brake mechanism, a pair of brake shoe actuating levers pivoted at adjacent ends and having their ends opposite the pivots connected by an expanding device, and a brake shoe rockably and slidably connected to each lever, said expanding device comprising a shaft journaled on an axis substantially parallel to said pivots, a head on said shaft, a pair of links each pivotally connected to said head eccentrically of the axis of rotation of said shaft and pivotally connected to the respective levers at said ends opposite the lever pivots, and a torque transmitting connection between said shaft and said head providing freedom of movement of said head transversely of said shaft to equalize the pressures exerted on said lever ends by said links.

LAWRENCE R. BUCKENDALE.
RALPH K. SUPER.

REFERENCES CITED

The following references are of record in the file of this patent:

UNITED STATES PATENTS

| Number | Name | Date |
|---|---|---|
| Re. 22,586 | Spiller et al. | Jan. 2, 1945 |
| Re. 22,604 | Alden et al. | Feb. 30, 1945 |
| 1,812,551 | Poulet | June 30, 1931 |
| 1,971,861 | LaBrie | Aug. 28, 1934 |
| 2,212,523 | Hawley | Aug. 27, 1940 |
| 2,247,374 | Hawley | July 1, 1941 |
| 870,666 | Cookingham | Nov. 12, 1907 |
| 1,980,512 | White | Nov. 13, 1934 |
| 1,847,319 | Wentworth | Mar. 1, 1932 |